US012795525B2

(12) United States Patent
Catovic et al.

(10) Patent No.: US 12,795,525 B2
(45) Date of Patent: Nov. 10, 2026

(54) NETWORK SELECTION FOR SATELLITE ACCESS

(71) Applicant: QUALCOMM Incorporated, San Diego, CA (US)

(72) Inventors: Amer Catovic, San Diego, CA (US); Stephen William Edge, Escondido, CA (US); Lenaig Genevieve Chaponniere, La Jolla, CA (US); Osama Lotfallah, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1052 days.

(21) Appl. No.: 17/492,935

(22) Filed: Oct. 4, 2021

(65) Prior Publication Data

US 2022/0110051 A1 Apr. 7, 2022

Related U.S. Application Data

(60) Provisional application No. 63/088,930, filed on Oct. 7, 2020.

(51) Int. Cl.

*H04W 48/18* (2009.01)
*H04W 48/04* (2009.01)
*H04W 48/16* (2009.01)
*H04W 84/06* (2009.01)

(52) U.S. Cl.

CPC ........... *H04W 48/18* (2013.01); *H04W 48/04* (2013.01); *H04W 48/16* (2013.01); *H04W 84/06* (2013.01)

(58) Field of Classification Search

CPC ..... H04W 48/18; H04W 48/04; H04W 48/16; H04W 84/06
USPC .......................................................... 370/328
See application file for complete search history.

(56) References Cited

U.S. PATENT DOCUMENTS

| | | | | |
|---|---|---|---|---|
| 2020/0221372 | A1* | 7/2020 | Shih | H04W 76/25 |
| 2020/0245235 | A1 | 7/2020 | Chun | |
| 2022/0070812 | A1* | 3/2022 | Cheng | H04W 60/04 |

FOREIGN PATENT DOCUMENTS

| | | | | |
|---|---|---|---|---|
| CN | 105519143 A | | 4/2016 | |
| CN | 108322908 A | | 7/2018 | |
| EP | 4185006 A1 | * | 5/2023 | H04W 36/322 |

(Continued)

OTHER PUBLICATIONS

Nokia, et al. New Solution for the PLMN selection part of Key Issue #10 (NPL: SA WG2 Meeting #136, Nov. 2019 (Year: 2019).*

(Continued)

*Primary Examiner* — Chuck Huynh
(74) *Attorney, Agent, or Firm* — QUALCOMM Incorporated

(57) ABSTRACT

Certain aspects of the present disclosure provide techniques for performing a public land mobile network (PLMN) selection procedure based on allowed PLMN(s) in a particular country of a user equipment (UE). An example method generally includes determining a country in which the UE is located, creating a list of available PLMNs, that are allowed to be selected in the country in which the UE is located, for access to a non-terrestrial network (NTN), and performing a PLMN selection procedure for access to the NTN based on the list of available PLMNs and the country in which the UE is located.

28 Claims, 13 Drawing Sheets

(56) References Cited

FOREIGN PATENT DOCUMENTS

WO WO-2020197271 A1 10/2020

OTHER PUBLICATIONS

"3rd Generation Partnership Project, Technical Specification Group Core Network and Terminals, Study on PLMN Selection for Satellite Access (Release 17)", 3GPP Standard, Technical Report, 3GPP TR 24.821, 3rd Generation Partnership Project (3GPP), Mobile Competence Centre, 650, route des Lucioles, F-06921 Sophia-Antipolis Cedex, France No. V0.4.0, Mar. 15, 2021 (Mar. 15, 2021), pp. 1-38, XP052000013, Retrieved from the Internet: URL: https://www.3gpp.org/Specs/archive/24_Series/24.821/24821-040.zip, [retrieved on Jan. 20, 2022], The whole document.

"3rd Generation Partnership Project, Technical Specification Group Services and System Aspects, Study on Architecture Aspects for Using Satellite Access in SG (Release 17)", 3GPP Standard, Technical Report, 3GPP TR 23.737, 3rd Generation Partnership Project (3GPP), Mobile Competence Centre, 650, Route Des Lucioles, F-06921 Sophia-Antipolis Cedex, France, No. V17.1.0, Jul. 9, 2020 (Jul. 9, 2020), pp. 1-92, XP051924392, Retrieved from the Internet: URL: http://ftp.3gpp.org/Specs/archive/23_series/23.737/23737-h10.zip, 23737-h10.docx [retrieved on Jul. 9, 2020] pp. 59-61, 64-65, 71-72.

International Search Report and Written Opinion—PCT/US2021/053613—ISA/EPO—Jan. 31, 2022.

Nokia, et al., "Network Selection for NR Satellite Access", 3GPP TSG-SA WG2 Meeting #140E, S2-2007486 (Revision of S2-200xxxx), Elbonia, Aug. 19, 2020-Sep. 1, 2020, 31 Pages, Oct. 2, 2020.

Nokia, et al., "New Solution for the PLMN Selection Part of Key Issue #10", SA WG2 Meeting #136, S2-1912042 (Revision of S2-1911515), Nov. 18, 2019-Nov. 22, 2019, Reno NV, USA, Nov. 22, 2019, pp. 1-4.

Qualcomm Incorporated: "PLMN Selection for Satellite Networks", 3GPP TSG CT WG1 Meeting #125-e, C1-204670, 3GPP, vol. CT WG, No. Electronic meeting, Aug. 20, 2020-Aug. 28, 2020, Aug. 13, 2020, 3 Pages, XP051919250, Whole document.

* cited by examiner

NETWORK SELECTION FOR SATELLITE ACCESS

CROSS-REFERENCE TO RELATED APPLICATIONS

This application claims benefits of and priority to U.S. Provisional Patent Application No. 63/088,930, filed on Oct. 7, 2020, which is assigned to the assignee hereof and herein incorporated by reference in the entirety as if fully set forth below and for all applicable purposes.

FIELD OF THE DISCLOSURE

Aspects of the present disclosure relate to wireless communications, and more particularly, to techniques for performing a public land mobile network (PLMN) selection procedure for access to a non-terrestrial network (NTN).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Non-terrestrial networks (NTNs) are another technology that utilizes satellites to provide wireless services and expand coverage areas. NTNs have the capability of providing reliable connectivity to areas which were previously difficult to connect. Thus, NTNs have the potential to be a valuable option to expand coverage and access to previously unserved communities.

However, as the demand for mobile broadband access continues to increase, there exists a need for further improvements in NR and LTE technology, including NTN deployments. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performing a public land mobile network (PLMN) selection procedure based on allowed PLMN(s) in a particular country of a user equipment (UE).

Certain aspects of the subject matter described in this disclosure can be implemented in a method for wireless communication by a UE. The method generally includes determining a country in which the UE is located, receiving an indication of public land mobile networks (PLMNs), creating a list of available PLMNs, that are allowed to be selected in the country in which the UE is located, for access to a non-terrestrial network (NTN), based on an indication of allowed countries for the one or more of the PLMNs, and performing a PLMN selection procedure for access to the NTN based on the list of available PLMNs and the country in which the UE is located.

Certain aspects of the subject matter described in this disclosure can be implemented in a method. The method generally includes configuring a user equipment (UE) with information indicating a public land mobile network (PLMN) ID of a PLMN for which the network entity provides access to a non-terrestrial network (NTN) and indicating, in the information, an associated list of countries in which the PLMN is allowed to be selected.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
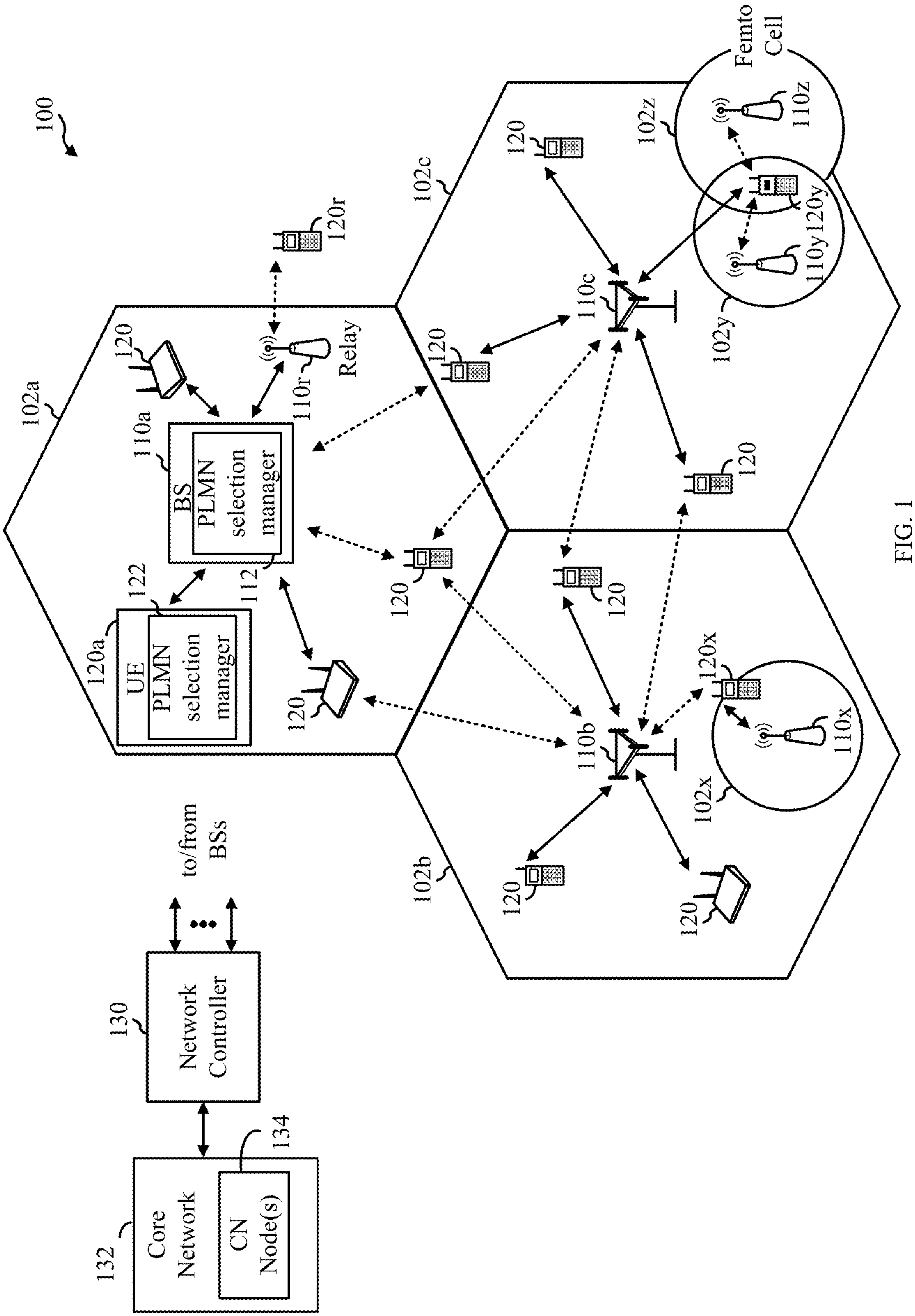
FIG. 1 is a block diagram conceptually illustrating an example telecommunications system, in accordance with certain aspects of the present disclosure.

Aspects of the present disclosure provide apparatus, methods, processing systems, and computer readable mediums for performing a public land mobile network (PLMN) selection procedure for non-terrestrial access to a network, for example, via a satellite. The PLMN may be allowed to be selected in various countries.

In conventional scenarios (e.g., terrestrial networks), the UE typically needs to know a mobile country code (MCC) of a serving PLMN. This MCC is used during PLMN re-selection when roaming, so the UE can restrict its search for higher priority PLMN(s) to those with the same MCC.

A UE may also need to know its own location to determine when it is in international areas (with no specific country). Under NTN coverage, for PLMN selection for satellite access, the UE must always first determine its country. However MCC-based location/country determination may not work for NTN and a UE may not be able to rely on MCCs for various reasons. For example, an NTN radio cell may span multiple countries by design and PLMN IDs may have a corresponding MCC to indicate this (e.g., MCC=9xx).

The techniques may facilitate PLMN selection when a UE is served by a non-terrestrial network (NTN), by providing the UE an indication of which PLMNs the UE is allowed to select in a country in which the UE is currently located or when the UE is in international areas.

The following description provides examples of performing a PLMN selection procedure based on allowed PLMN(s) in a particular country of a UE, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 (e.g., a 5G NR network) in which aspects of the present disclosure may be performed. For example, the wireless communication network 100 may include a UE 120 with a PLMN selection manager 122 configured to perform operations 700 of FIG. 7 and/or a BS 110 with a PLMN selection manager 112 configured to perform operations 800 of FIG. 8.

As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

Figure 2:
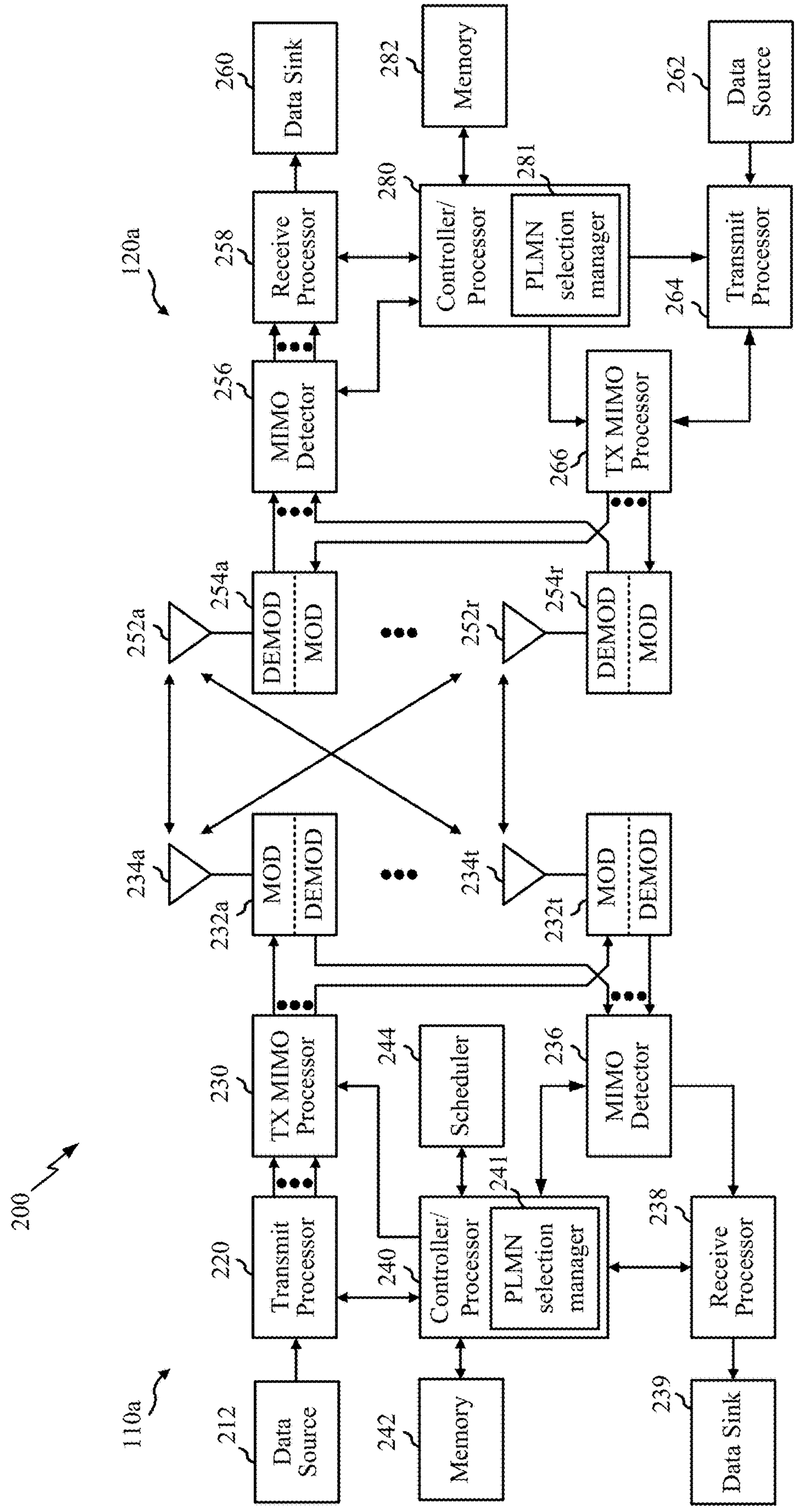
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure. For example, the UE 120*a* may include a PLMN selection manager 281 configured to perform operations 700 of FIG. 7. Similarly, the BS 110*a* may include a PLMN selection manager 241 configured to perform operations 800 of FIG. 8.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has an network selection manager 241 that may configure the UE 120*a* for determining a country in which the UE is located, creating a list of available PLMNs, that are allowed to be selected in the country in which the UE is located, for access to a NTN, and performing a PLMN selection procedure for access to the NTN based on the list of available PLMNs and the country in which the UE is located, according to aspects described herein. As shown in FIG. 2, the controller/processor 280 of the UE 120*a* has an network selection manager 281 that may be configured for broadcasting system information indicating a PLMN ID of a PLMN for which the network entity provides access to a NTN, and indicating, in the system information, an associated list of countries in which the PLMN is allowed to be selected, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
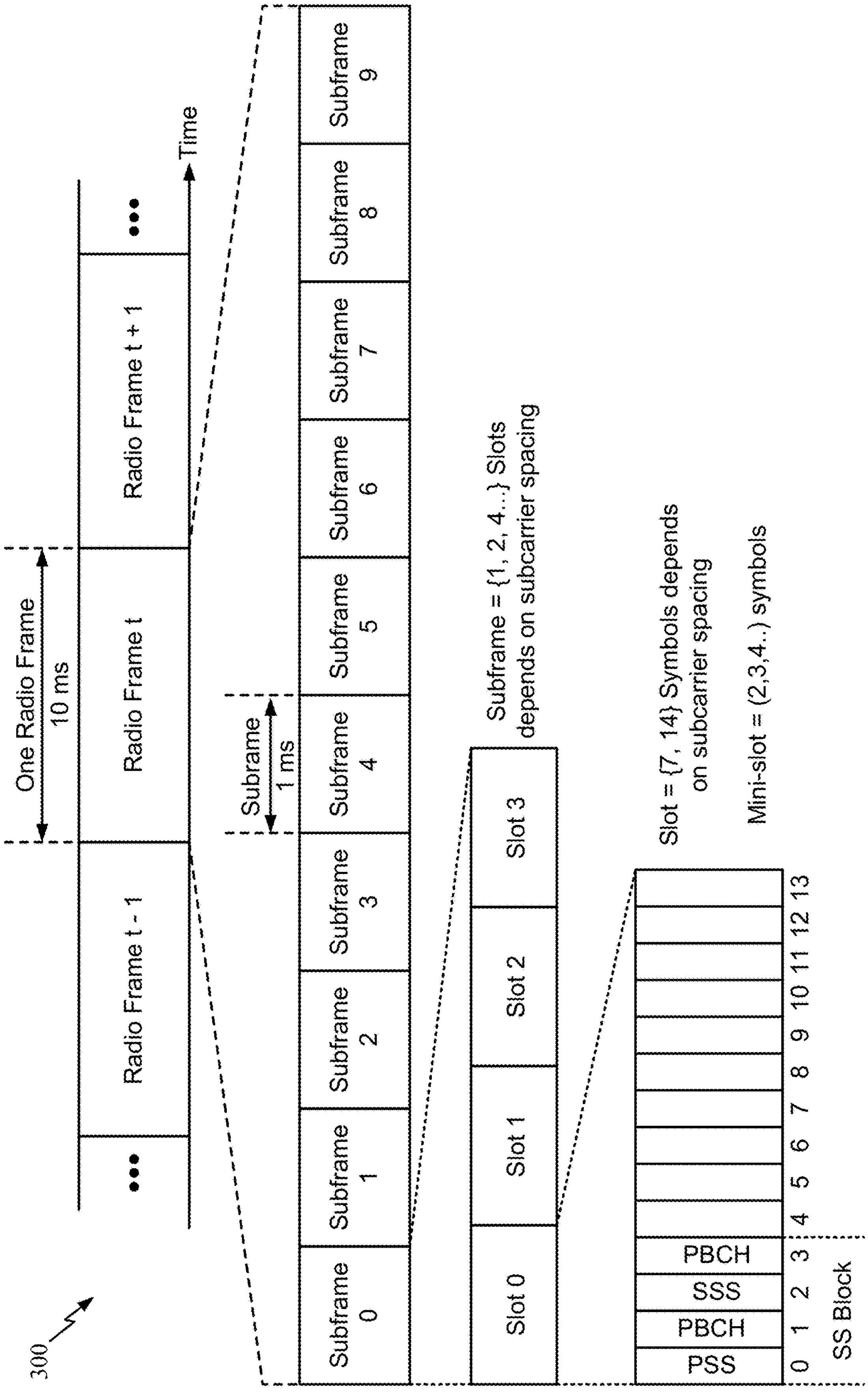
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block may be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 4:
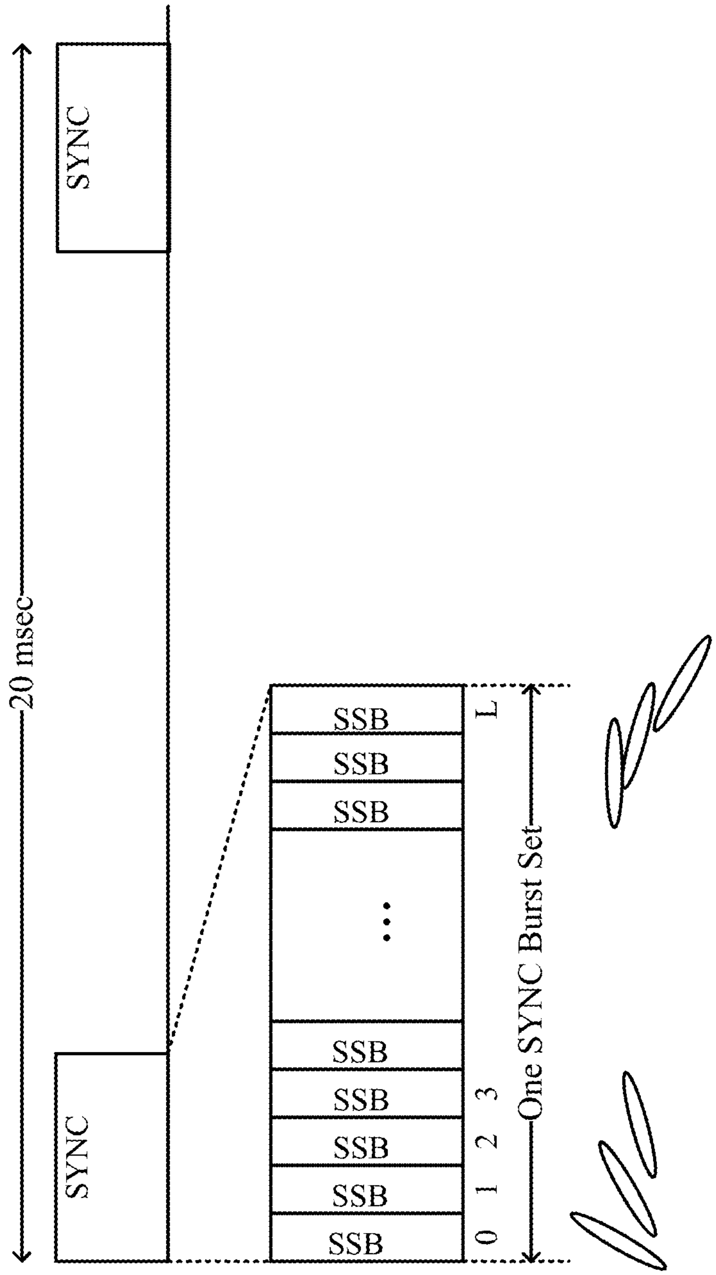
FIG. 4 illustrates how synchronization signal block (SSB) transmission using different beams, in accordance with certain aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Example NTN

Figure 5:
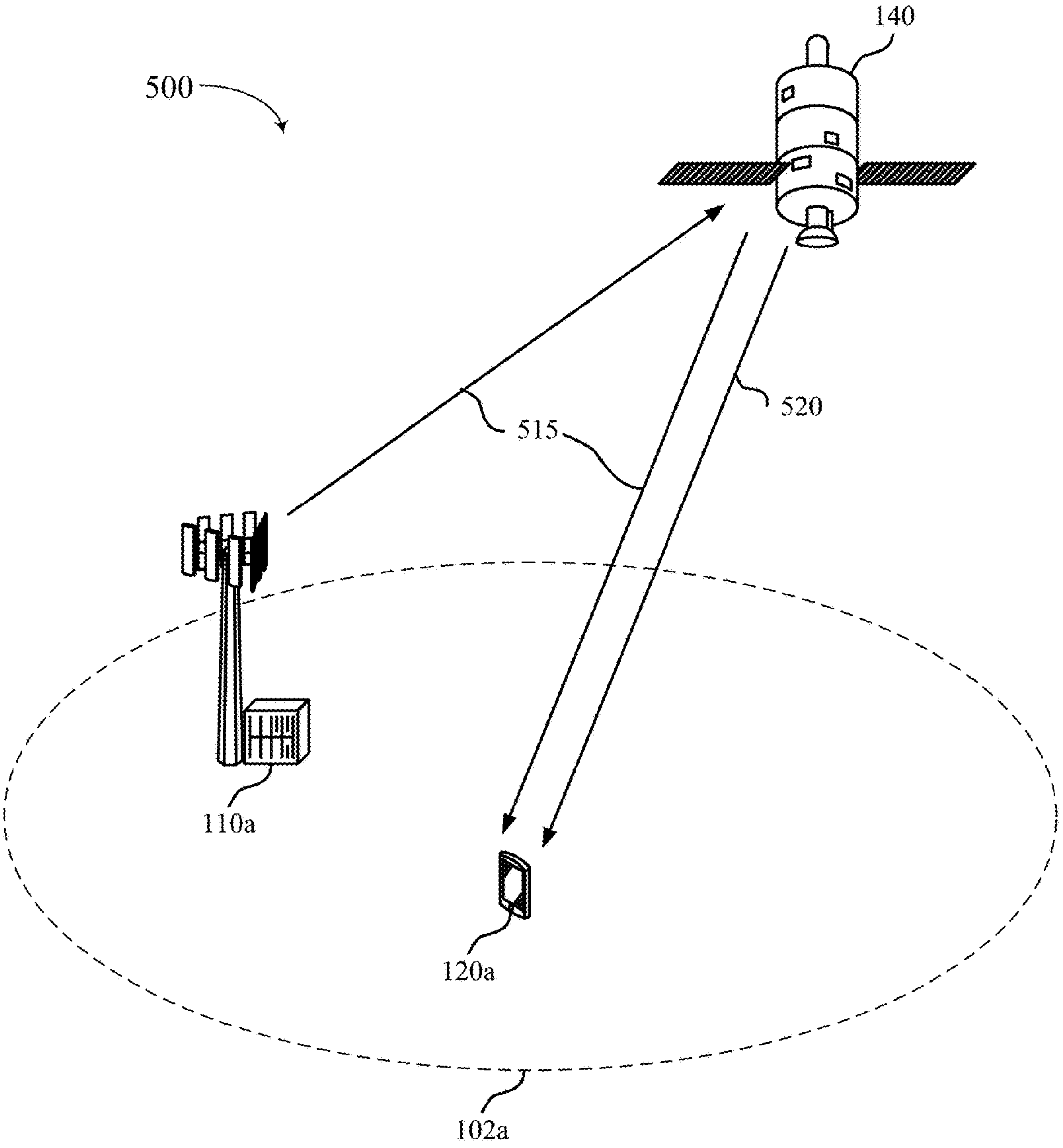
FIG. 5 is a block diagram conceptually illustrating an example telecommunications system, in accordance with certain aspects of the present disclosure.

FIG. 5 illustrates an example of a wireless communications system 500 that supports SSB transmissions with different frequency intervals, in accordance with aspects of the present disclosure. In some examples, wireless communications system 500 may implement aspects of wireless communication network 100. For example, wireless communications system 500 may include BS 110*a*, UE 120*a*, and satellite 140. BS 110*a* may serve coverage area or cell 102*a* in cases of a terrestrial network, and satellite 140 may serve coverage area 102*a* in cases of a non-terrestrial network (NTN). Some NTNs use high altitude platforms (e.g., balloons) in place of satellites.

Satellite 140 may communicate with BS 110*a* and UE 120*a* as part of wireless communications in an NTN. In cases of a terrestrial network, UE 120*a* may communicate with BS 110*a* over a communication link. In the case of NTN wireless communications, satellite 140 may be the serving BS for UE 120*a*. In certain aspects, the satellite 140 may act as a relay for the BS 110*a* and the UE 120*a*, relaying both data transmission and control signaling 515.

Satellite 140 may orbit the earth's surface at a particular altitude. The distance between satellite 140 and UE 120*a* may be much greater than the distance between BS 110*a* and UE 120*a*. The distance between UE 120*a* and satellite 140 may cause an increased round-trip delay (RTD) in communications between UE 120*a* and satellite 140. The satellite motion may cause the Doppler effect and contribute to a frequency shift in communications between UE 120*a* and satellite 140. The frequency shift may be also contributed to by error related to the local oscillation of either UE 120*a* or satellite 140. The RTD and frequency shift associated with communications in NTNs may lead to inefficiency in transmissions, latency, and inability to accurately transmit and receive messages.

UE 120*a* may determine to connect to satellite 140 using a random access procedure (e.g., a four-step RACH). The initiation of the RACH procedure may begin with the transmission of a random access preamble (e.g., NR PRACH) by UE 120*a* to satellite 140 or base station 110*a*. UE 120*a* may transmit the random access preamble in the PRACH. In some PRACH designs, there may be no estimation or accounting for the RTD or the frequency shift associated with NTNs. In certain networks, such as terrestrial NR networks (e.g., 5G NR), SSBs transmitted by a cell are transmitted on the same frequency interval (e.g., occupying the same frequency interval). In NTN, a satellite may use multiple antennas to form multiple narrow beams and the beams may operate on different frequency intervals to mitigate interference among the beams.

Example Network Selection for Satellite Access

Aspects of the present disclosure provide techniques for performing PLMN selection for non-terrestrial network (NTN) access, for example, via a satellite. As will be described herein, a satellite coverage area may span multiple countries. Therefore, a PLMN associated with a satellite may have a list of associated countries, in which a UE is allowed to select that PLMN.

In general, a (legacy) PLMN selection procedure is a procedure which the UE uses to select a network to camp on and receive service (e.g., as specified in TS 23.122). The legacy PLMN selection procedure can occur in one of two ways. The first is when a UE switches on, PLMNs are to be selected in a particular order. The UE will initially look to select the last registered PLMN, if available. If that PLMN is not available, then the UE proceeds down an ordered list of PLMNs to select:

i) Either the home PLMN (HPLMN) (if the equivalent HPLMN (EHPLMN) list is not present or is empty) or the highest priority EHPLMN that is available (if the EHPLMN list is present);
ii) Each PLMN and/or access technology combination in the "User Controlled PLMN Selector with Access Technology" data file in the subscriber identity module (SIM) (e.g., in priority order);
iii) Each PLMN and/or access technology combination in the "Operator Controlled PLMN Selector with Access Technology" data file in the SIM (e.g., in priority order) or stored in the mobile equipment (ME) or UE (e.g., in priority order);
iv) Other PLMN and/or access technology combinations with received high signal quality (e.g., in random order); or
v) Other PLMN and/or access technology combinations in order of decreasing signal quality.

The second way a PLMN selection procedure could occur is via periodic PLMN selection for a roaming UE. That is, a roaming UE can periodically search for a higher priority PLMN and re-select to a higher priority PLMN in the same country as the serving (current) PLMN (e.g., according to the same prioritization as the PLMN selection upon switch on). In some cases, the UE may also consider PLMNs in a list of equivalent PLMNs provided by the serving PLMN (e.g., using non-access stratum (NAS) protocol signaling during the registration procedure).

In some cases, it may be beneficial to modify the typical (legacy) PLMN selection procedure described to accommodate satellite access networks. However, various deployments of satellite networks, as described below with respect to FIGS. 6A-6E, present some issues with each of the various satellite network deployments.

Figure 6A:
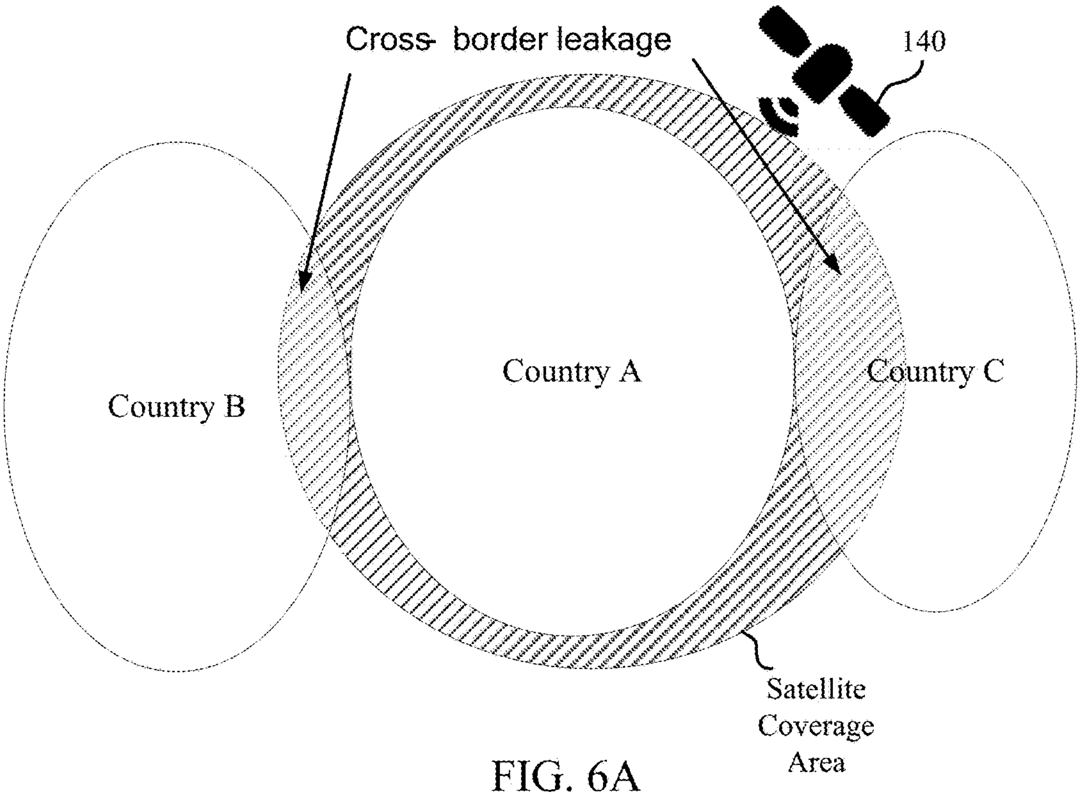
FIGS. 6A, 6B, 6C, 6D, and 6E are diagrams of example deployment scenarios of non-terrestrial networks (NTNs), in accordance with certain aspects of the present disclosure.

FIG. 6A shows a deployment where NTN cell coverage from a satellite 140 targeting one country (e.g., Country A) or a portion of it. A PLMN identifier (ID) may be broadcast associated with a mobile country code (MCC) of Country A and/or a mobile network code (MNC) allocated by Country A. However, there may be cross-border leakage into adjacent countries (e.g., countries B and/or C, as shown), which may not make it clear how and/when a UE (located in a particular country) is allowed to select the PLMN.

Figure 6B:
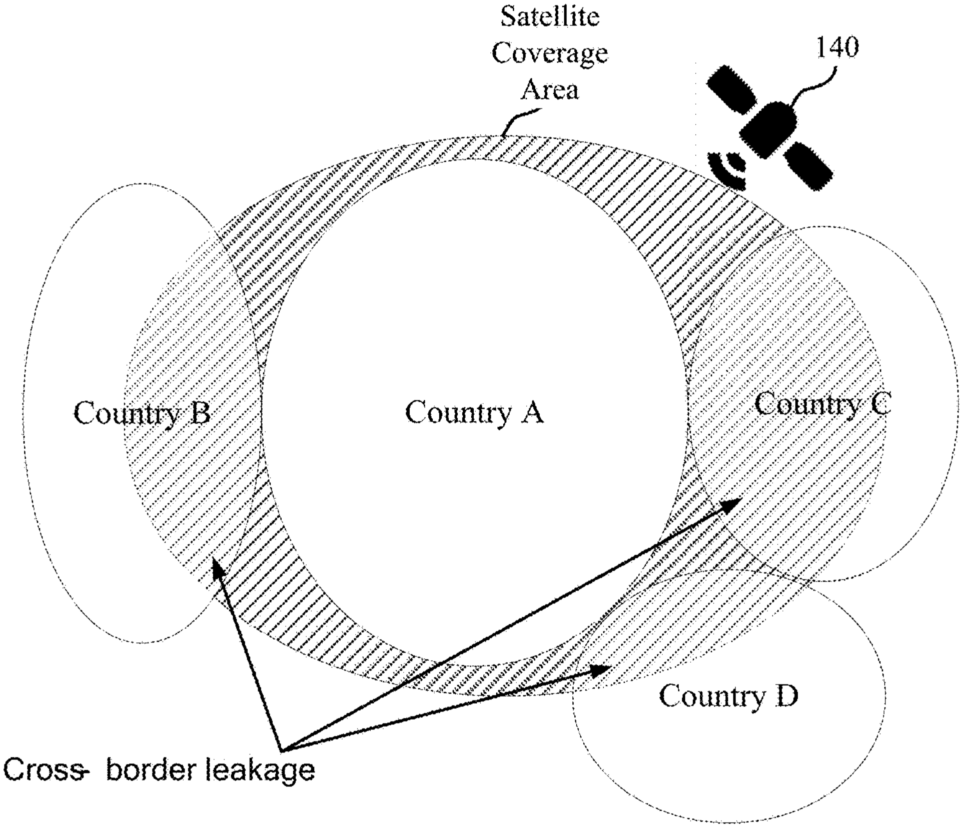

FIG. 6B shows a deployment where NTN cell coverage targets multiple countries (e.g., countries A, B, and C), with cross-border leakage into Country D. In this deployment, there exists various options for broadcasting PLMN ID. In a first scenario, three PLMN IDs are broadcast, one for each country (e.g., country A, B, or C). This scenario also assumes an operator is active in all three countries (or at least two countries). In second scenario, a PLMN ID with MCC corresponding to Country A is broadcast, and the operator may get permission from Country B and Country C to use MCC A in these countries as well (e.g., as specified in international telecommunication union (ITU) specification E.212). In a third scenario, a PLMN ID with a shared (e.g., global) MCC (e.g., 9xx) is broadcast. In this case, the operator would still need permission from Country B and Country C to use the global MCC in these countries. Furthermore, the operator obtains the global MCC and/or MNC from the ITU specification. However, this scenario is generally impractical for massive global use.

Figure 6C:
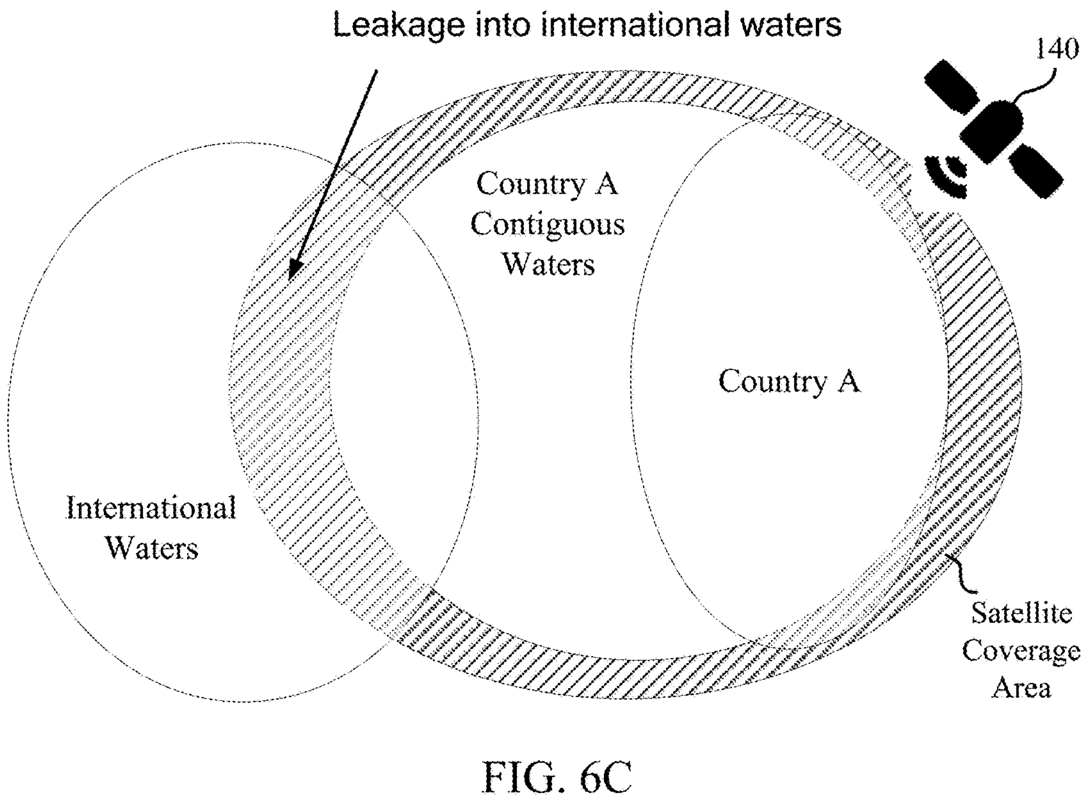

FIG. 6C shows a deployment where NTN cell coverage targets one country and that country's contiguous waters (e.g., Country A). In general, contiguous waters extend up to 200 miles from the shore of a given country. This is referred to as leakage into international waters. For broadcasting PLMN ID in this deployment, there exist different scenarios. In a first scenario the broadcast PLMN ID has the MCC of Country A (e.g., similar to the scenario associated with FIG. 6A). In another scenario, the PLMN ID includes the MCC of Country A and a global MCC reserved for the international waters.

Figure 6D:
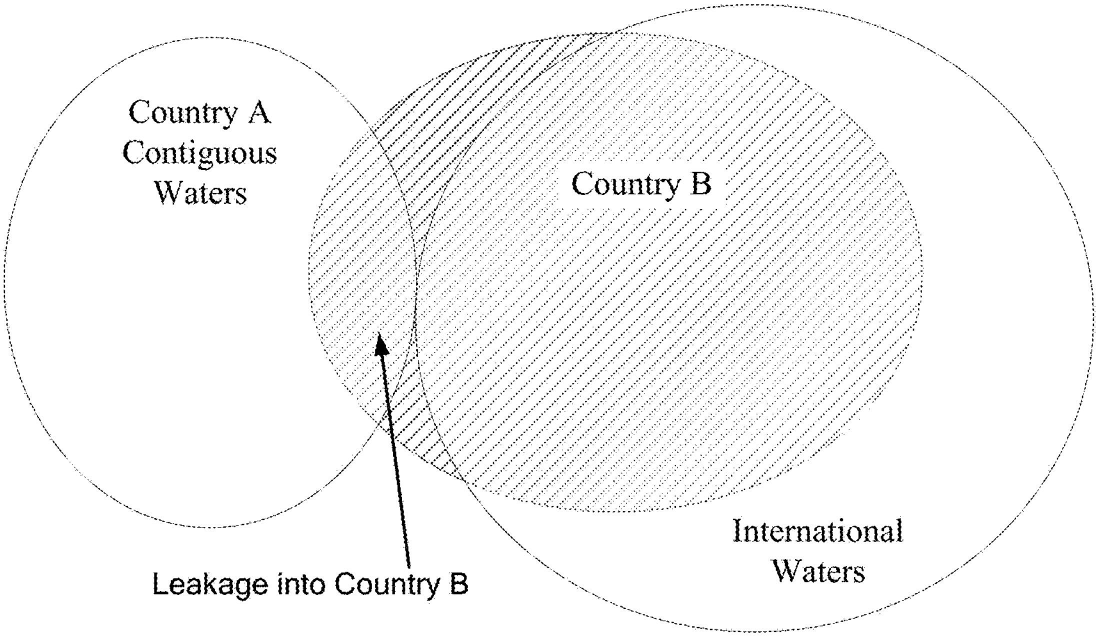

FIG. 6D shows a deployment where NTN cell coverage targets international waters only. In this deployment, there is leakage into adjacent contiguous waters of Country A. While it is uncertain whether this is a valid (practical) scenario, questions can still be raised, such as how spectrum allocation in international waters ought to be handled. Nevertheless, in this deployment, the PLMN ID could be broadcast in accordance with multiple different scenarios. In a first scenario, the MCC of the home country of the operator is included in the PLMN ID. In a second scenario, the global MCC is included. In a third scenario, the MCC of the home country of the operator and the global MCC reserved for international waters is included.

Figure 6E:
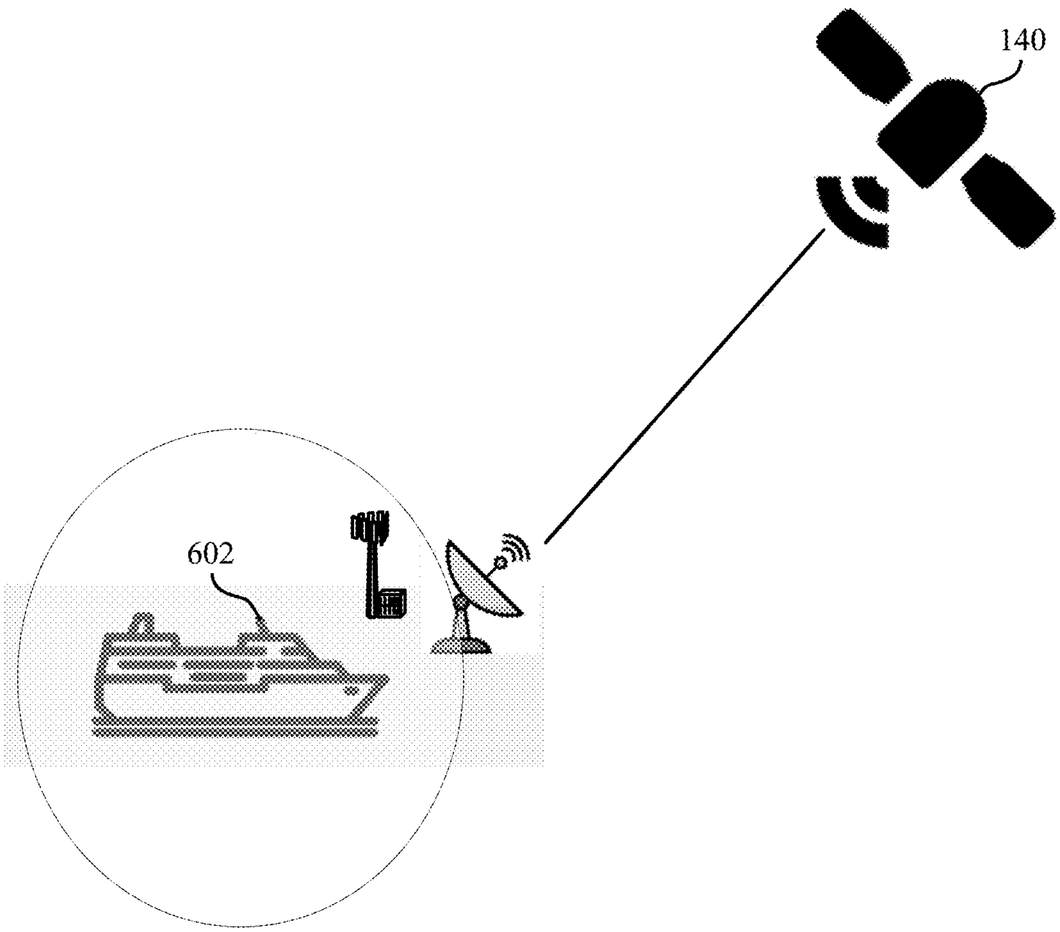

FIG. 6E shows a deployment of a legacy satellite-based deployment scenario for ships (e.g., the ship 602) and airplanes. In this case, the satellite link is used only as backhaul. Furthermore, 3GPP access may be provided by an onboard radio access network (RAN). This deployment would be applicable to international waters and/or airspace (e.g., if the ship 602 were instead an aircraft). Furthermore, this deployment may experience little or no issues with cross-border leakage or with PLMN ID usage.

Given the various issues presented in the deployments described above, it may be advantageous for a UE to implement a modified version of a PLMN selection procedure in order to access an NTN. As will be described herein, the UE may generate a list of available PLMNs that are allowed to be selected for a particular country and perform a PLMN procedure for a NTN based on the list of allowed (or available) PLMN(s) and/or the country in which the UE is located. The techniques may also be applied for PLMN selection when the UE is in international areas (outside any particular country, such as international waters).

The techniques described herein may be deployed, for example, by a UE to perform PLMN selection for satellite access. In some cases, satellite access may be considered as a separate radio access technology (RAT) from terrestrial access. This makes sense, for example, because satellite access typically uses a separate frequency band as compared to terrestrial access.

Additionally, it may be assumed that a UE performing PLMN selection for non-terrestrial (satellite) access is configured with "User Controlled PLMN Selector with Access Technology" and/or "Operator Controlled PLMN Selector with Access Technology" files in the Universal SIM (USIM). Each of these files may contain a prioritized (e.g., ordered) list of PLMNs with corresponding supported RATs.

In general, the PLMN selection procedure may be executed at the NAS protocol layer. As described above, each PLMN may broadcast, in the system information, its own identity (e.g., PLMN ID), which includes a MCC uniquely defining the country of the PLMN. Thus, lower layers (e.g., the access stratum (AS)) may scan the available networks and provide the list of available PLMNs along with the RAT they are available at to the NAS layer.

Figure 7:
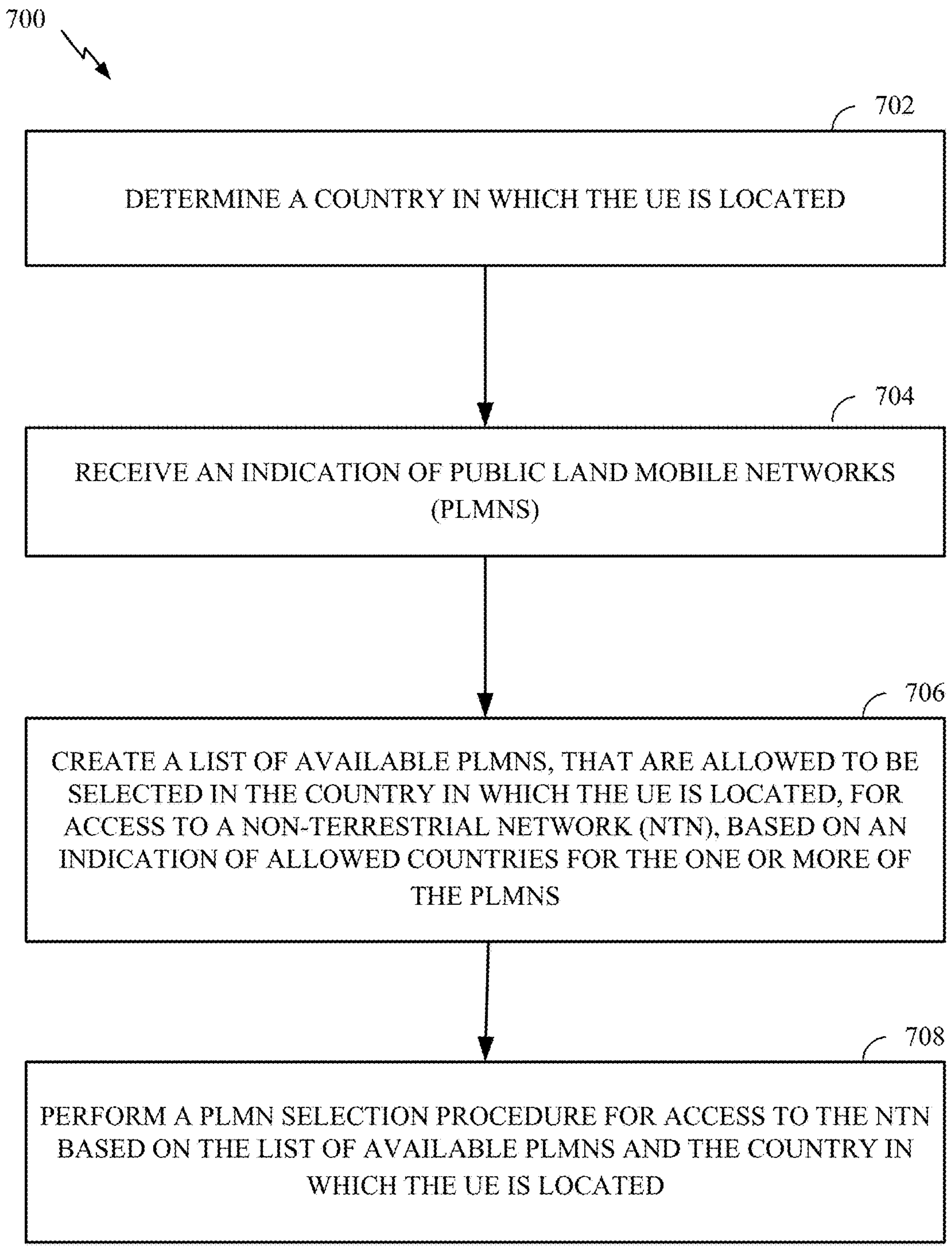
FIG. 7 is a flow diagram illustrating example operations for wireless communication by a UE, in accordance with certain aspects of the present disclosure.

FIG. 7 illustrates example operations 700 for wireless communication, in accordance with certain aspects of the present disclosure. The operations 700 may be performed, for example, by UE (e.g., such as a UE 120*a* in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 begin, at 702, by determining a country in which the UE is located.

At 704, the UE receives an indication of public land mobile networks (PLMNs).

At 706, the UE creates a list of available PLMNs, that are allowed to be selected in the country in which the UE is located, for access to a non-terrestrial network (NTN), based on an indication of allowed countries for the one or more of the PLMNs.

At 710, the UE performs a PLMN selection procedure for access to the NTN based on the list of available PLMNs and the country in which the UE is located.

Figure 8:
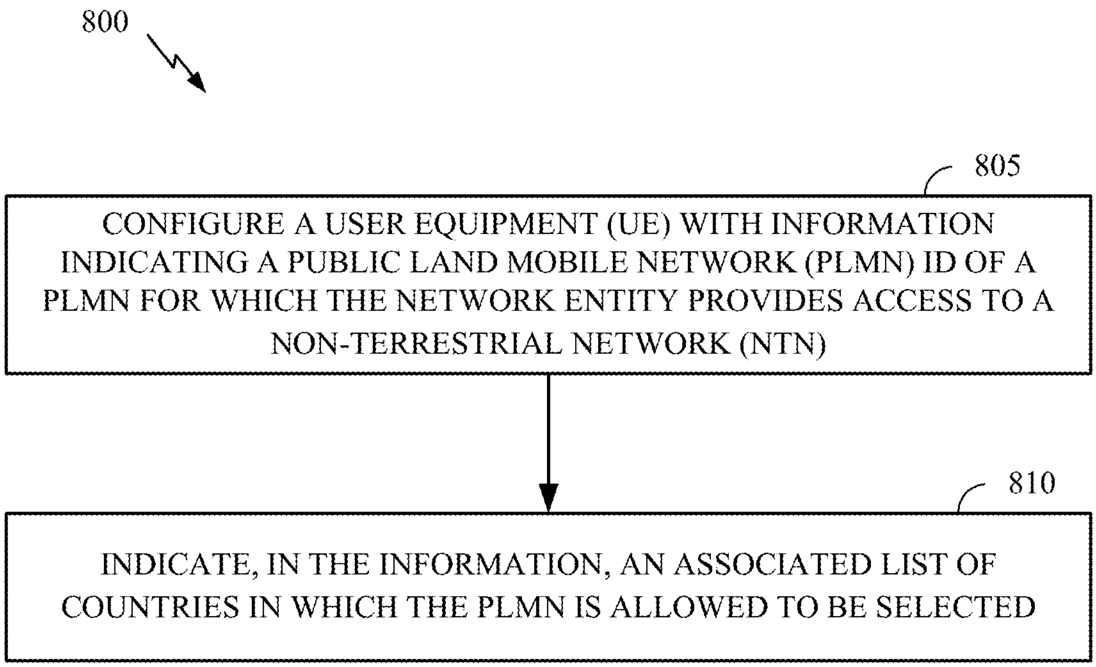
FIG. 8 is a flow diagram illustrating example operations for wireless communication by a network entity (e.g., in a non-terrestrial network (NTN)), in accordance with certain aspects of the present disclosure.

FIG. 8 illustrates example operations 800 that may be considered complementary to operations 700 of FIG. 7. For example operations 800 may be performed to configure a UE performing operations 700 of FIG. 7 with information regarding in which countries the UE is allowed to select give PLMNs. Operations 800 may be implemented as software components that are executed and run on one or more processors. Further, the transmission and reception of signals in operations 800 may be enabled, for example, by one or more antennas. In certain aspects, the transmission and/or reception of signals may be implemented via a bus interface of one or more processors obtaining and/or outputting signals.

Operations 800 begin, at 805, by configuring a user equipment (UE) with information indicating a public land mobile network (PLMN) ID of a PLMN for which the network entity provides access to a non-terrestrial network (NTN).

Operations 800 continue, at 810, by indicating, in the information, an associated list of countries in which the PLMN is allowed to be selected.

In certain aspects, each PLMN broadcasts the list of countries (e.g., MCCs for each country) in which the country is allowed to be selected. The associated counties may be indicated in different ways, as demonstrated by the various examples below:

Example 1: PLMN ID=310 150 (e.g., USA AT&T). Additional countries in which the network is allowed to be selected are broadcast as 302 (Canada) and 334 (Mexico).

Example 2: PLMN ID=310 150 (e.g., USA AT&T). Additional countries in which the network is allowed to be selected are indicated by providing PLMN IDs valid in those countries such as 302 XXX (e.g., Canada) and 334 YYY (e.g., Mexico).

Example 3: PLMN ID=901 44 (e.g., global AT&T PLMN ID). Countries in which the network is allowed to be selected are broadcast as 302 (e.g., Canada) and 334 (e.g., Mexico).

Example 4: PLMN ID=901 44 (e.g., global AT&T PLMN ID). Countries in which the network is allowed to be selected are indicated by providing PLMN IDs valid in those countries such as 302 XXX (e.g., Canada) and 334 YYY (e.g., Mexico).

In some cases, if no additional countries are indicated, the PLMN is assumed (e.g., by the UE) to be allowed to be selected only in the home country of the PLMN (e.g., the USA). If the MCC of the PLMN is a global MCC (e.g., 9xx), the PLMN is assumed to be allowed in all countries.

In certain aspects, for each PLMN, there can be configured (e.g., in the PLMN selector files in USIM) the list of additional countries (e.g., the MCCs) in which it is allowed to operate. This functionality can be added, for example, as an additional aspect in the existing user controlled PLMN selector (e.g., with the access technology and operator controlled PLMN selector or with access technology files/a new file dedicated to this aspect).

Again, if no additional countries are indicated, the PLMN may be assumed (by the UE) to be allowed to be selected only in its home country of the PLMN (e.g., the USA) if there is a home country. If the MCC of the PLMN is a global MCC (e.g., 9xx), the PLMN is assumed to be allowed in all countries.

In certain aspects, the UE may eliminate all PLMNs that are not allowed to be selected in the country in which the UE is located. In this case, the UE receives (e.g., via the NAS layer) the list of available (allowed) PLMNs from the lower layers along with the list of countries (MCCs) in which they are allowed to be selected. The UE may look up in the USIM, for each PLMN received from the lower layers, the list of countries in which the PLMN is allowed to be selected. In some cases, the UE prunes all the available PLMNs that are not allowed to be selected in the same country as the UE.

In certain aspects, satellite access is configured as a new RAT in the USIM. For each PLMN in the “User Controlled PLMN Selector with Access Technology” and the “User Controlled PLMN Selector with Access Technology” files in the USIM, there may be an indication of whether if the PLMN supports satellite access RAT(s). In some cases, support for satellite RAT(s) can also be indicated in the HPLMN selector with the access technology file in the USIM. The UE may limit the search for available PLMNs only to PLMNs supporting satellite access, and/or only to frequencies supporting satellite access.

In certain aspects, for searching for a higher priority PLMN when roaming, the UE may use different values for time intervals between the searches with respect to the time intervals used for terrestrial access. In the legacy procedure (described above), a roaming UE initiates the search for a higher priority PLMN periodically. The time interval between the searches is selected randomly within a given range (e.g., between 6 minutes and 8 hours, in 6 minute steps, where the default is 1 hour). In some cases, a separate time interval for the periodic PLMN search may be configured when the UE is using satellite access as opposed to terrestrial access. Furthermore, the time interval for satellite access could be selected from a different range compared to a range associated with terrestrial access.

Figure 9:
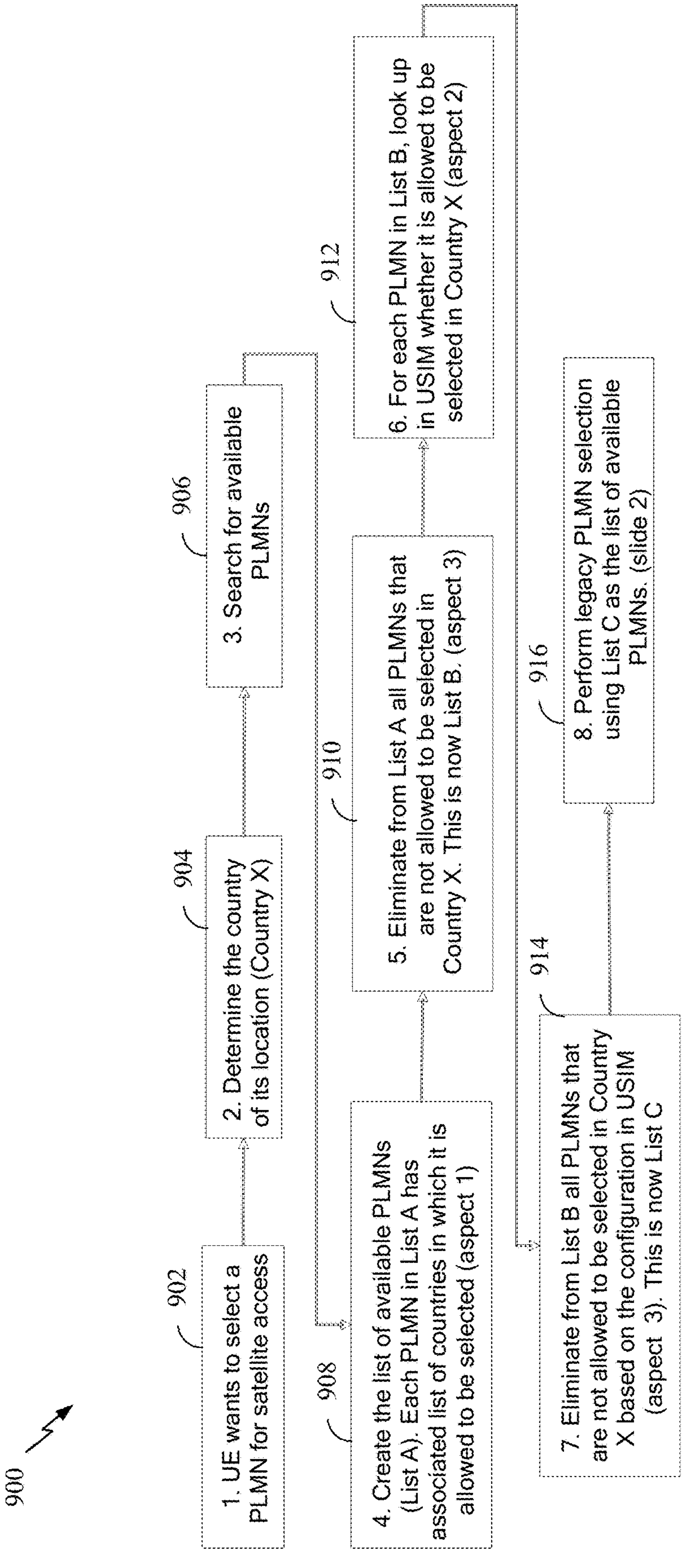
FIG. 9 is a flow diagram of an example procedure for selecting a new public land mobile network (PLMN), in accordance with certain aspects of the present disclosure.

FIG. 9 is a flow diagram 900 that shows how a UE may perform the operations described above to perform PLMN selection for satellite access. As shown, at 902, the UE determines that it wishes to select a PLMN for satellite access. At 904, the UE determines the country of its location. At 906, the UE searches for available PLMNs (e.g., scanning for broadcast PLMN information).

At 908, the UE creates a list of available PLMNs (e.g., List A). Each PLMN in List A may have an associated list of countries in which it is allowed to be selected (indicated via any of the mechanisms described above).

AT 910, the UE, eliminates, from List A, all PLMNs that are not allowed to be selected in Country X (the location of the UE). The list may then be referred to as List B.

At 912, the UE, for each PLMN in List B, looks up in USIM whether it is allowed to be selected in its country. At 914, the UE eliminates, from List B, all PLMNs that are not allowed to be selected in its country based on the configuration in USIM. The list may then be referred to as List C.

Finally, at 916, the UE performs legacy PLMN selection using List C as the list of available PLMNs.

As noted above, PLMNs in list A (per step 908), with associated countries where PLMNs can be selected, may be provided by the lower layers (e.g., the AS layer) to the NAS layer.

As noted above (in steps 908 and 912), in some cases, default values may apply for PLMNs that have no information associated with the countries where they can be selected. For example, for PLMN with a global MCC (e.g., 9xx), the default could be either "allowed everywhere" or "not allowed anywhere."

In certain aspects (at step 916), PLMN prioritization from the files in the USIM may be used (e.g., using prioritization criteria described above, with reference to conventional PLMN selection procedures).

As noted above, from the network perspective, for satellite access, the network broadcasts the PLMN and associated countries described above (e.g., in the system information on the broadcast channel of each satellite cell). As noted above, the PLMN ID of the serving network (e.g., legacy) and/or an indication of the countries in which the PLMN represented by the PLMN ID is allowed to be selected. In this case, the indication may include a list of PLMN IDs valid in each country in which the PLMN is allowed to be selected and/or a list of MCCs representing the countries in which the PLMN is allowed to be selected.

As described herein, a UE may perform PLMN selection based on information indicating which countries given PLMNs are allowed to be selected in. This information could be distributed in different ways, including broadcast information or configured by a vendor (e.g., in a SIM card). In some cases, to avoid any given network (e.g., a home network of an operator the UE is subscribed to) providing this information and having the ability to restrict the UE from selecting certain PLMNs globally, the information may be distributed in some other manner.

For example, an organization or other type of entity (a "legitimized" entity) may be authorized to determine and/or distribute information indicating which countries given PLMNs are allowed to be selected in. In some cases, this information may be published (e.g., on a website or standard specification) and/or a vendor might pre-configure a UE with this information. In this manner, an authorized entity may determine and distribute this information similar to, for example, how the International Telecommunication Union (ITU) assigns country codes and manages frequency allocations to different countries.

Figure 10:
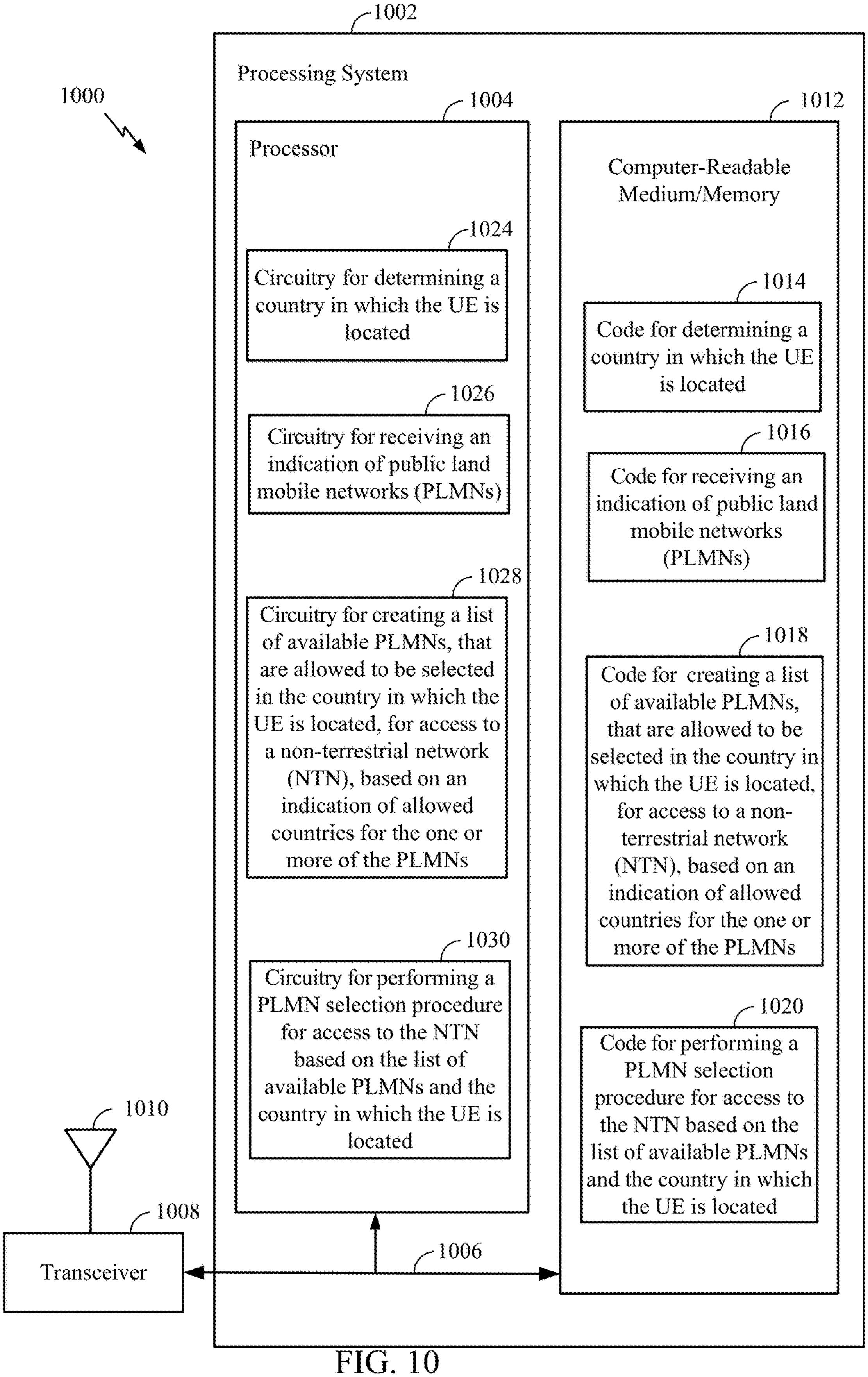
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for SSBs in different frequency intervals in NTN. In certain aspects, computer-readable medium/memory 1012 stores code 1014 for determining a country in which the UE is located; code 1016 for receiving an indication of PLMNs; code 1018 for creating a list of available PLMNs, that are allowed to be selected in the country in which the UE is located, for access to a NTN, based on an indication of allowed countries for the one or more of the PLMNs; and code 1022 for performing a PLMN selection procedure for access to the NTN based on the list of available PLMNs and the country in which the UE is located. In certain aspects, the processor 1004 has circuitry configured to implement the code stored in the computer-readable medium/memory 1012. The processor 1004 includes circuitry 1024 for determining a country in which the UE is located; circuitry 1026 for receiving an indication of PLMNs; circuitry 1028 for creating a list of available PLMNs, that are allowed to be selected in the country in which the UE is located, for access to a NTN, based on an indication of allowed countries for the one or more of the PLMNs; and circuitry 1032 for performing a PLMN selection procedure for access to the NTN based on the list of available PLMNs and the country in which the UE is located.

Figure 11:
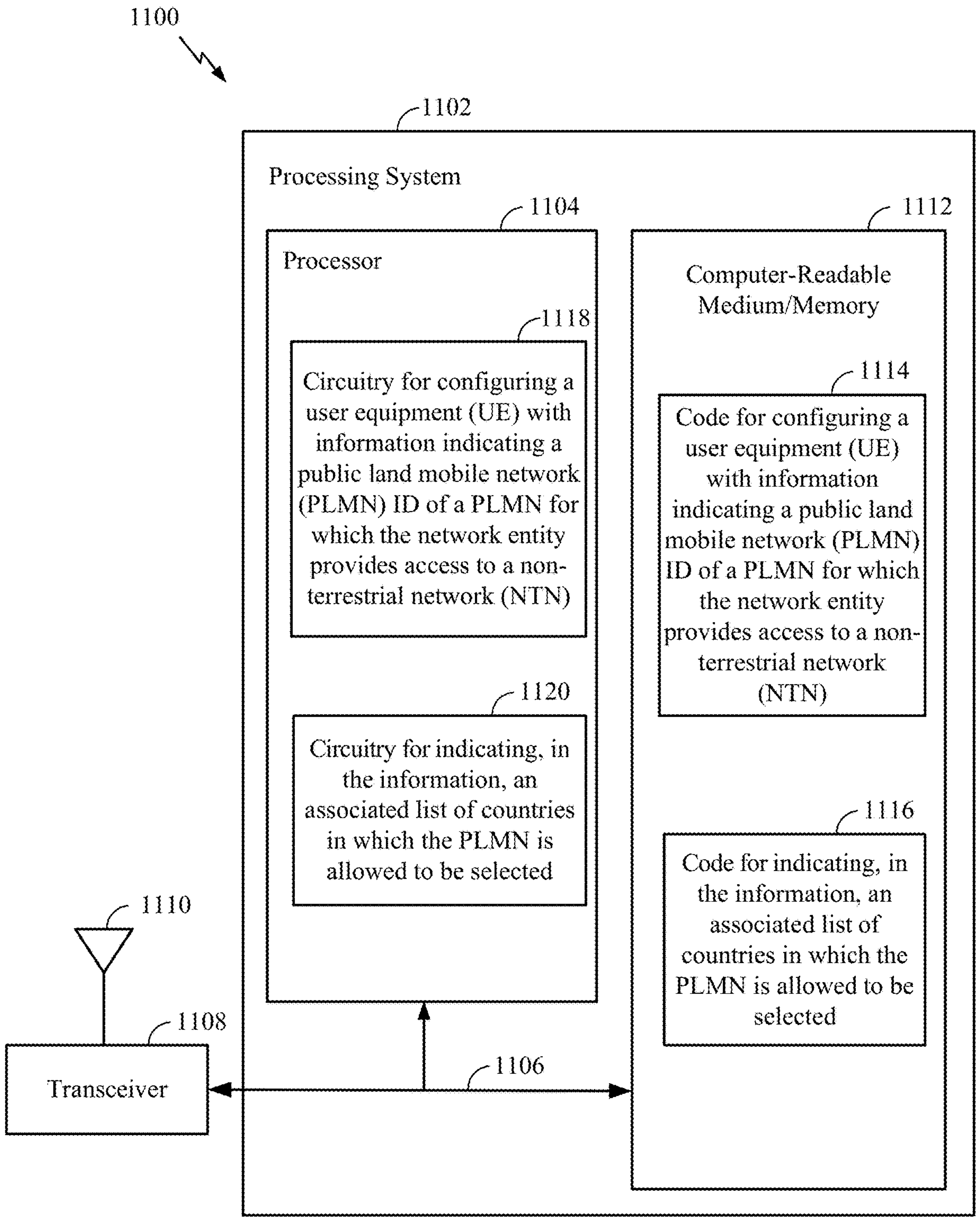
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for configuring a user equipment (UE) with information indicating a public land mobile network (PLMN) ID of a PLMN for which the network entity provides access to a non-terrestrial network (NTN); and code 1116 for indicating, in the information, an associated list of countries in which the PLMN is allowed to be selected. In certain aspects, the processor 1104 has circuitry configured to implement the code stored in the computer-readable medium/memory 1112. The processor 1104 includes circuitry 1118 for configuring a user equipment (UE) with information indicating a public land mobile network (PLMN) ID of a PLMN for which the network entity provides access to a non-terrestrial network (NTN); and circuitry 1120 for indicating, in the information, an associated list of countries in which the PLMN is allowed to be selected.

Example Clauses

Implementation examples are described in the following numbered clauses:

Clause 1. A method for wireless communications by a user equipment (UE), comprising: determining a country in which the UE is located; receiving an indication of public land mobile networks (PLMNs); creating a list of available PLMNs, that are allowed to be selected in the country in which the UE is located, for access to a non-terrestrial network (NTN), based on an indication of allowed countries for the one or more of the PLMNs; and performing a PLMN selection procedure for access to the NTN based on the list of available PLMNs and the country in which the UE is located.

Clause 2. The method of Clause 1, wherein the UE is configured with information indicating which countries in which one or more PLMNs are allowed to be selected.

Clause 3. The method of Clause 2, wherein the information is at least one of: preconfigured in the UE; or published by an authorized entity.

Clause 4. The method of Clause 2, wherein the information indicates a country-specific PLMN ID for a PLMN and additional countries in which that PLMN is allowed to be selected.

Clause 5. The method of Clause 4, wherein the additional countries in which that PLMN is allowed to be selected are indicated by a list of mobile country codes (MCCs) for those countries.

Clause 6. The method of Clause 4, wherein the additional countries in which that PLMN is allowed to be selected are indicated by providing PLMN IDs valid in those countries.

Clause 7. The method of Clause 2, wherein the information indicates a global PLMN ID for a PLMN and additional countries in which that PLMN is allowed to be selected.

Clause 8. The method of Clause 7, wherein the additional countries in which that PLMN is allowed to be selected are indicated by a list of mobile country codes (MCCs) for those countries.

Clause 9. The method of Clause 7, wherein the additional countries in which that PLMN is allowed to be selected are indicated by providing PLMN IDs valid in those countries.

Clause 10. The method of Clause 2, wherein, if the information does not indicate additional countries in which a PLMN is allowed to be selected, the UE assumes: that PLMN is allowed to be selected in its home country only; or if that PLMN has a global PLMN ID, that PLMN is allowed to be selected in all countries.

Clause 11. The method of any one of Clauses 1-10, wherein the UE obtains the indication of the allowed countries for the one or more of the PLMNs via one or more PLMN selector files stored in a Universal Subscriber Identity Module (USIM) at the UE, the PLMN selector files comprising: a prioritized list of one or more PLMNs; and for each PLMN in the prioritized list, an indication of additional countries that the PLMN is allowed to be selected in.

Clause 12. The method of Clause 11, wherein the PLMN selector files comprise at least one of: a user controlled PLMN selector file with PLMN information specific for non-terrestrial access radio access technologies (RATs); or an operator controlled PLMN selector file with PLMN information specific for non-terrestrial access RATs.

Clause 13. The method of Clause 11, wherein, if a PLMN does not have an indication of additional countries in which a PLMN is allowed to be selected, the UE assumes: that PLMN is allowed to be selected in its home country only; or if that PLMN has a global PLMN ID, that PLMN is allowed to be selected in all countries.

Clause 14. The method of Clause 11, wherein creating the list comprises: creating a first list of available PLMNs based on broadcast signaling; creating a second list based on the one or more PLMN selector files stored in USIM; and combining the first list and the second list.

Clause 15. The method of Clause 14, wherein combining the first list and the second list comprises: eliminating PLMNs that are not allowed to be selected in the country in which the UE is located.

Clause 16. The method of any one of Clauses 1-15, wherein creating the list comprises: creating a first list of available PLMNs based on broadcast signaling; determining which PLMNs of a first list support non-terrestrial access radio access technologies (RATs), based on the one or more PLMN selector files stored in a Universal Subscriber Identity Module (USIM); and limiting the list to PLMNs that support non-terrestrial access RATs.

Clause 17. The method of Clause 16, wherein the one or more PLMN selector files comprise at least one of: a user controlled PLMN selector file with PLMN information specific for non-terrestrial access RATs; an operator controlled PLMN selector file with PLMN information specific for non-terrestrial access RATs; or a home PLMN selector file with PLMN information specific for non-terrestrial access RATs.

Clause 18. The method of Clause 16, wherein the UE determines PLMNs support non-terrestrial access RATs based on frequencies supporting satellite access.

Clause 19. The method of any one of Clauses 1-18, further comprising: performing a PLMN search procedure for access to the NTN when roaming, wherein the UE uses different values for time intervals between searches relative to time intervals used for a PLMN search procedure for terrestrial access when roaming.

Clause 20. The method of Clause 19, wherein the UE is configured with at least one of: separate time intervals for performing periodic PLMN search procedures for terrestrial and non-terrestrial access; or different ranges of time intervals for performing periodic PLMN search procedures for terrestrial and non-terrestrial access.

Clause 21. A method, comprising: configuring a user equipment (UE) with information indicating a public land mobile network (PLMN) ID of a PLMN for which the network entity provides access to a non-terrestrial network (NTN); and indicating, in the information, an associated list of countries in which the PLMN is allowed to be selected by the UE.

Clause 22. The method of Clause 21, wherein the PLMN ID indicated in the information comprises a country-specific or global PLMN ID.

Clause 23. The method of Clause 22, wherein the information indicates additional countries in which the PLMN is allowed to be selected.

Clause 24. The method of Clause 23, wherein the additional countries in which that PLMN is allowed to be selected are indicated by a list of mobile country codes (MCCs) for those countries.

Clause 25. The method of Clause 23, wherein the additional countries in which that PLMN is allowed to be selected are indicated by providing PLMN IDs valid in those countries.

Clause 26. The method of Clause 22, wherein the information indicates a global PLMN ID for a PLMN and additional countries in which that PLMN is allowed to be selected.

Clause 27. The method of Clause 26, wherein the additional countries in which that PLMN is allowed to be selected are indicated by a list of mobile country codes (MCCs) for those countries.

Clause 28. The method of Clause 26, wherein the additional countries in which that PLMN is allowed to be selected are indicated by providing PLMN IDs valid in those countries.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), the method comprising:

determining, by the UE, a country in which the UE is located;

receiving, by the UE, an indication of public land mobile networks (PLMNs), wherein the UE is configured with information that indicates, for each on the one or more of the PLMNs, a PLMN identifier (ID) for the respective PLMN and one or more allowed countries for the respective PLMN;

creating, by the UE, a list of available PLMNs that are allowed to be selected in the country for access to a non-terrestrial network (NTN), wherein the creating the list is based on the configured information; and performing, by the UE, a PLMN selection procedure, for access to the NTN, based on the list of available PLMNs and the country in which the UE is located.

2. The method of claim 1, wherein the information is at least one of:

preconfigured in the UE; or published by an authorized entity.

3. The method of claim 1, wherein the PLMN ID is a country-specific PLMN identifier (ID) for the respective PLMN.

4. The method of claim 1, wherein the allowed countries are indicated by a list of mobile country codes (MCCs) for the allowed countries.

5. The method of claim 1, wherein the allowed countries are indicated by PLMN IDs valid in the allowed countries.

6. The method of claim 1, wherein the PLMN ID is a global PLMN identifier (ID) for the respective PLMN.

7. The method of claim 6, wherein the allowed countries are indicated by a list of mobile country codes (MCCs) for the allowed countries.

8. The method of claim 6, wherein the allowed countries are indicated by PLMN IDs valid in the allowed countries.

9. The method of claim 1, wherein, if the information does not indicate any allowed countries for a PLMN of the PLMNs, the UE assumes:

that PLMN is allowed to be selected in its home country only; or if that PLMN has a global PLMN ID, that PLMN is allowed to be selected in all countries.

10. The method of claim 1, wherein the information is configured by obtaining the information via one or more PLMN selector files stored in a Universal Subscriber Identity Module (USIM) at the UE, the PLMN selector files comprising:

a prioritized list of one or more PLMNs; and for each PLMN in the prioritized list, an indication of the allowed countries for that PLMN.

11. The method of claim 10, wherein the PLMN selector files comprise at least one of:

a user-controlled PLMN selector file with PLMN information that is specific for non-terrestrial access radio access technologies (RATs); or an operator-controlled PLMN selector file with PLMN information that is specific for non-terrestrial access RATs.

12. The method of claim 10, wherein, if the information does not indicate any allowed countries for a PLMN, the UE assumes:

that PLMN is allowed to be selected in its home country only; or if that PLMN has a global PLMN ID, that PLMN is allowed to be selected in all countries.

13. The method of claim 10, wherein the creating the list comprises:

creating a first list of available PLMNs based on broadcast signaling;

creating a second list based on the one or more PLMN selector files stored in the USIM; and combining the first list and the second list.

14. The method of claim 13, wherein the combining the first list and the second list comprises eliminating, from the first list, PLMNs that are not allowed to be selected in the country in which the UE is located, the eliminating being based on the second list.

15. The method of claim 1, wherein creating the list comprises:

creating a first list of available PLMNs based on broadcast signaling;

determining which PLMNs of the first list support non-terrestrial access radio access technologies (RATs), the determining being based on one or more PLMN selector files stored in a Universal Subscriber Identity Module (USIM); and limiting the first list to the determined PLMNs that support non-terrestrial access RATs.

16. The method of claim 15, wherein the one or more PLMN selector files comprise at least one of:

a user-controlled PLMN selector file with PLMN information that is specific for non-terrestrial access RATs;

an operator-controlled PLMN selector file with PLMN information that is specific for non-terrestrial access RATs; or a home PLMN selector file with PLMN information that is specific for non-terrestrial access RATs.

17. The method of claim 15, wherein the determining which PLMNs, of the first list, support non-terrestrial access RATs is based on frequencies supporting satellite access.

18. The method of claim 1, further comprising performing a PLMN search procedure for access to the NTN when roaming, wherein the performing includes using different values for time intervals between searches relative to time intervals used for a PLMN search procedure for terrestrial access when roaming.

19. The method of claim 18, wherein the UE is configured with at least one of:

separate time intervals for performing periodic PLMN search procedures for terrestrial and non-terrestrial access; or different ranges of time intervals for performing periodic PLMN search procedures for terrestrial and non-terrestrial access.

20. An apparatus for wireless communications by a user equipment (UE), the apparatus comprising:

memory storing computer-executable code;

at least one processor configured to, individually or collectively, execute the computer executable code and cause the apparatus to:

determine, by the UE, a country in which the UE is located;

receive, by the UE, an indication of public land mobile networks (PLMNs), wherein the UE is configured with information that indicates, for each on the one or more of the PLMNs, a PLMN identifier (ID) for the respective PLMN and one or more allowed countries for the respective PLMN;

create, by the UE, a list of available PLMNs that are allowed to be selected in the country for access to a non-terrestrial network (NTN), wherein the creating the list is based on the configured information; and perform, by the UE, a PLMN selection procedure, for access to the NTN, based on the list of available PLMNs and the country in which the UE is located.

21. The apparatus of claim 20, wherein the information is at least one of:

preconfigured in the apparatus; or published by an authorized entity.

22. The apparatus of claim 20, wherein the PLMN ID is a country-specific PLMN ID for the respective PLMN.

23. The apparatus of claim 22, wherein the allowed countries are indicated by a list of mobile country codes (MCCs) for the allowed countries.

24. The apparatus of claim 22, wherein the allowed countries are indicated by PLMN IDs valid in the allowed countries.

25. The apparatus of claim 20, wherein the PLMN ID is a global PLMN ID for the respective PLMN.

26. The apparatus of claim 25, wherein the allowed countries are indicated by a list of mobile country codes (MCCs) for the allowed countries.

27. The apparatus of claim 25, wherein the allowed countries are indicated by PLMN IDs valid in the allowed countries.

28. A non-transitory computer-readable medium storing computer-executable code for wireless communications by a user equipment (UE), the computer-executable code comprising:

code for determining, by the UE, a country in which the UE is located;

code for receiving, by the UE, an indication of public land mobile networks (PLMNs)), wherein the UE is configured with information that indicates, for each on the one or more of the PLMNs, a PLMN identifier (ID) for the respective PLMN and one or more allowed countries for the respective PLMN;

code for creating, by the UE, a list of available PLMNs that are allowed to be selected in the country for access to a non-terrestrial network (NTN), wherein the creating the list is based on the configured information; and performing, by the UE, a PLMN selection procedure, for access to the NTN, based on the list of available PLMNs and the country in which the UE is located.

* * * * *